(12) United States Patent
Kuchi

(10) Patent No.: US 7,065,156 B1
(45) Date of Patent: Jun. 20, 2006

(54) HOPPED DELAY DIVERSITY FOR MULTIPLE ANTENNA TRANSMISSION

(75) Inventor: Kiran Kuchi, Irving, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 1436 days.

(21) Appl. No.: 09/653,524

(22) Filed: Aug. 31, 2000

(51) Int. Cl.
*H04L 27/04* (2006.01)
*H04L 27/12* (2006.01)
*H04L 27/20* (2006.01)

(52) U.S. Cl. .................... 375/299; 455/101

(58) Field of Classification Search ........ 375/259, 375/260, 267, 295, 299; 455/101, 103
See application file for complete search history.

(56) References Cited

U.S. PATENT DOCUMENTS

| | | | |
|---|---|---|---|
| 5,289,499 A | | 2/1994 | Weerackody |
| 5,943,372 A | | 8/1999 | Gans et al. |
| 6,088,408 A | * | 7/2000 | Calderbank et al. ........ 375/347 |
| 6,178,196 B1 | * | 1/2001 | Naguib et al. ............. 375/148 |
| 6,185,258 B1 | * | 2/2001 | Alamouti et al. .......... 375/260 |
| 6,356,605 B1 | * | 3/2002 | Hosur et al. ............... 375/347 |
| 6,424,642 B1 | * | 7/2002 | Schmidl et al. ............ 370/342 |
| 6,424,679 B1 | * | 7/2002 | Dabak et al. ............... 375/267 |
| 6,430,231 B1 | * | 8/2002 | Calderbank et al. ........ 375/295 |
| 6,449,314 B1 | * | 9/2002 | Dabak et al. ............... 375/267 |
| 6,459,740 B1 | * | 10/2002 | Lo ........................... 375/259 |
| 6,501,803 B1 | * | 12/2002 | Alamouti et al. .......... 375/265 |
| 6,542,556 B1 | | 4/2003 | Kuchi et al. |
| 6,549,585 B1 | * | 4/2003 | Naguib et al. ............. 375/267 |
| 6,587,515 B1 | * | 7/2003 | Jafarkhani et al. ......... 375/299 |

FOREIGN PATENT DOCUMENTS

| EP | 0736979 | 10/1996 |
|---|---|---|
| EP | 0767546 | 4/1997 |

* cited by examiner

*Primary Examiner*—Jean B. Corrielus
(74) *Attorney, Agent, or Firm*—Brian T. Rivers

(57) ABSTRACT

A method and apparatus for providing hopped delay diversity for multiple antenna transmissions. In the method and apparatus, an input symbol stream is offset in time by M symbol periods to generate or offset symbol stream. The offset input stream may be offset so as to lead or lag the original input symbol stream. The original input symbol stream is then transmitted on a first set of N antennas and the offset input symbol stream is transmitted on a second set of N antennas, with transmit diversity techniques applied to the transmissions from the first and second set of N antennas.

23 Claims, 2 Drawing Sheets

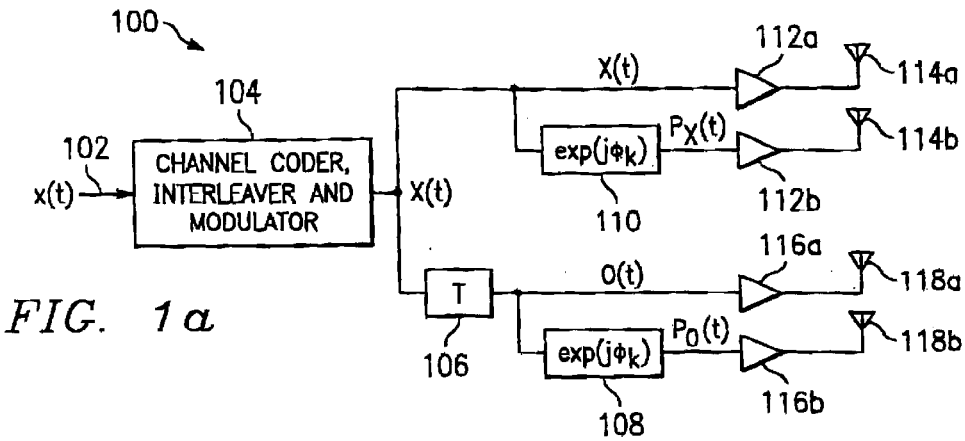
FIG. 1a
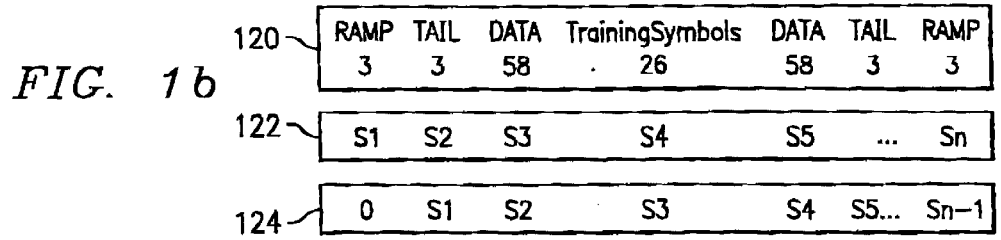
FIG. 1b
FIG. 1c
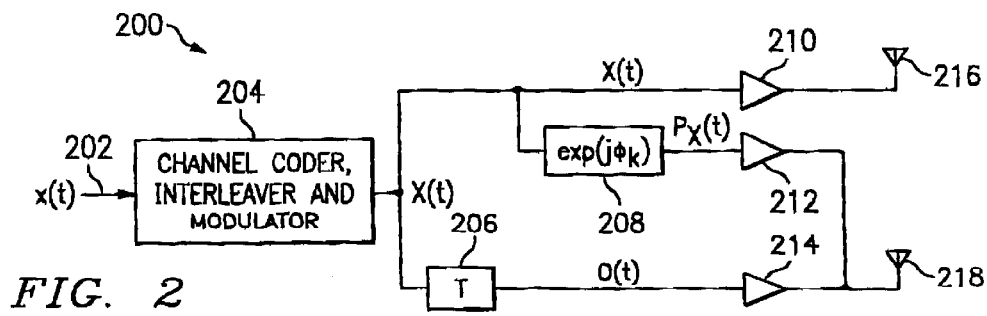
FIG. 2

HOPPED DELAY DIVERSITY FOR MULTIPLE ANTENNA TRANSMISSION

FIELD OF THE INVENTION

This invention relates to a method and apparatus for achieving transmit diversity in telecommunication systems and, more particularly, to methods and apparatus of hopped delay diversity for transmission on multiple antennas.

BACKGROUND OF THE INVENTION

As wireless communication systems evolve, wireless system design has become increasingly demanding in regard to equipment and performance requirements. Future wireless systems, which will be third and fourth generation systems compared to the first generation analog and second generation digital systems currently in use, will be required to provide high quality high transmission rate data services in addition to high quality voice services. Concurrent with the system service performance requirements will be equipment design constraints, which will strongly impact the design of mobile terminals. The third and fourth generation wireless mobile terminals will be required to be smaller, lighter, more power-efficient units that are also capable of providing the sophisticated voice and data services required of these future wireless systems.

Time-varying multi-path fading is an effect in wireless systems whereby a transmitted signal propagates along multiple paths to a receiver causing fading of the received signal due to the constructive and destructive summing of the signals at the receiver. Several methods are known for overcoming the effects of multi-path fading, such as time interleaving with error correction coding, implementing frequency diversity by utilizing spread spectrum techniques, or transmitter power control techniques. Each of these techniques, however, has drawbacks in regard to use for third and fourth generation wireless systems. Time interleaving may introduce unnecessary delay, spread spectrum techniques may require large bandwidth allocation to overcome a large coherence bandwidth, and power control techniques may require higher transmitter power than is desirable for sophisticated receiver-to-transmitter feedback techniques that increase mobile terminal complexity. All of these drawbacks have negative impact on achieving the desired characteristics for third and fourth generation mobile terminals.

Antenna diversity is another technique for overcoming the effects of multi-path fading in wireless systems. In diversity reception, two or more physically separated antennas are used to receive a signal, which is then processed through combining and switching to generate a received signal. A drawback of diversity reception is that the physical separation required between antennas might make diversity reception impractical for use on the forward link in the new wireless systems where small mobile terminal size is desired. A second technique for implementing antenna diversity is transmit diversity. In transmit diversity a signal is transmitted from two or more antennas and then processed at the receiver by using maximum likelihood sequence estimator (MLSE) or minimum mean square error (MMSE) techniques. Transmit diversity has more practical application to the forward link in wireless systems in that it is easier to implement multiple antennas in the base station than in the mobile terminal.

As new types of communications systems are developed and standardized, it will be desirable to develop methods of transmit diversity that may be implemented into these new types of systems with minimum modifications to the system. For transmit diversity in wireless systems, methods that may be implemented on the forward link of existing widely used standards with little or no modification to the receiver in the mobile station would be highly useful.

SUMMARY OF THE INVENTION

The present invention presents a method and apparatus for providing hopped delay diversity for multiple antenna transmissions. In the method and apparatus, an input symbol stream is offset in time by M symbol periods to generate an offset symbol stream. The offset input stream may be offset so as to lead or lag the original input symbol stream. The original input symbol stream is then transmitted on a first set of N antennas and the offset input symbol stream is transmitted on a second set of N antennas, with transmit diversity techniques applied to the transmissions from the first and second set of N antennas.

In an embodiment, the original input symbol stream is transmitted on the first set of N antennas with the original input symbol stream transmitted on a first at least one of the first set of N antennas and a phase shifted version of the original input symbol stream transmitted on a second at least one of the first set of N antennas. The offset input symbol stream is transmitted on a first at least one of the second set of N antennas and a phase shifted version of the offset input symbol stream is transmitted on a second at least one of the second set of N antennas. The phase shifting may be either a continuous phase sweep or discrete phase hopping in every burst period.

In another embodiment, the original input symbol stream is transmitted on a first set of N antennas with the original input symbol stream transmitted on a first at least one of the first set of N antennas and a phase shifted version of the original input symbol stream transmitted on a second at least one of the first set of N antennas. The offset input symbol stream is transmitted on a second set of N antennas which includes the second at least one of the first set of N antennas as one of its antennas. In an alternative of this embodiment, the offset input symbol stream may be phase shifted before it is transmitted.

In yet another embodiment, the original input symbol stream and offset input symbol stream are input to a first and second antenna, respectively, of said first set of N antennas and a first and second antenna, respectively, of said second set of N antennas, and hopped diversity is applied between the first and second sets of N antennas to alternately transmit the symbol streams from the first and second sets of N antennas.

BRIEF DESCRIPTION OF THE FIGURES

FIG. 1a is a block diagram of portions of a phase hopped delay diversity transmitter according to an embodiment of the invention;

FIG. 1b is an illustration of transmission bursts for use in the transmitter of FIG. 1a;

FIG. 1c is a phase hopping pattern for use in the transmitter of FIG. 1a;

FIG. 2 is a block diagram of portions of phase hopped delay diversity transmitter according to another embodiment of the invention;

FIG. 3b is an illustration of transmission bursts for use in the transmitter of FIG. 3a.

DETAILED DESCRIPTION OF THE INVENTION

Figure 3A:
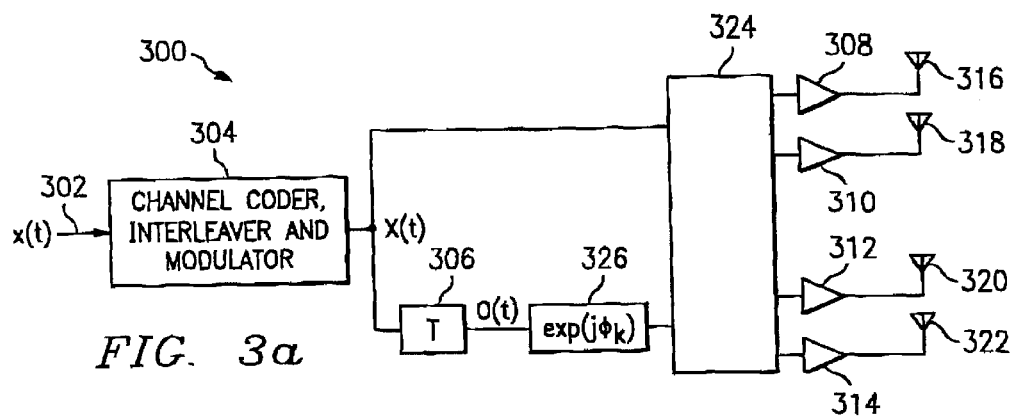
FIG. 3a is a block diagram of portions of an antenna hopped delay diversity transmitter according to still another embodiment of the invention.

Referring now to FIG. 1a, therein is illustrated a block diagram of portions of a phase hopped delay diversity transmitter according to an embodiment of the invention. Transmitter 100 includes input 102, Channel coder, Interleaver and Modulator (CIM) 104, offset block 106, phase shifter block 108, phase shifter block 110, RF circuitry blocks 112a, 112b, 116a and 116b, and antennas 114a, 114b, 118a and 118b. Transmitter 100 may be implemented in any type of transmission system that transmits coded or uncoded digital transmissions over a radio interface. In an embodiment transmitter 100 may be implemented into a system operating according to the enhanced data for global evolution (EDGE) specification. Transmitter 100 may be implemented into an EDGE system without modifications to the EDGE receiver.

In the embodiment of FIG. 1a, transmitter 100 receives input data stream at input 102 and generates an input symbol stream at the output of CIM 104. X(t) is split into two identical symbol streams, with one symbol stream X(t) being input to RF circuitry 112a and phase shifter block 110. Phase shifter block 110 outputs a phased shifted version of X(t) or $P_X(t)$. The other input symbol stream X(t) is input to offset block 106. Offset block 106 causes at least a one symbol period delay in the second input symbol stream X(t) being input to offset block 106 to generate an offset version of X(t) or O(t). The delayed input symbol stream, O(t), is then input to RF circuitry 116a and phase shifter block 108. Phase shifter block 108 outputs a phase shifted version of O(t) or $P_{O(t)}$.

X(t), $P_X(t)$, O(t) and $P_O(t)$ are input to RF circuitry 112a, 112b, 116a and 116b, respectively, and then X(t) is transmitted on antenna 114a and $P_X(t)$ is transmitted on antenna 114b. O(t) is transmitted on antenna 118a and $P_O(t)$ is transmitted on 118b.

The phase shifting performed in phase shifter blocks 110 and 108 may be performed in a variety of alternative ways. The phase shifting may be a continuous sweep or discrete phase hopping between burst periods. In systems where channel estimation is used, such as EDGE type systems, both traffic and training symbols can be given the same phase shift for channel estimation simplicity. Also, the phase pattern may be periodic or random. In the embodiment of FIG. 1, second order path diversity is realized due to offset block 106 and second order interleaving gain is realized between antennas 114a and 114b, and 118a and 118b, respectively, due to the channel coding.

Referring now to FIG. 1b, therein are illustrated transmission bursts for use in transmitter 100 of FIG. 1a as the input symbol stream X(t). Each burst 120 starts with 3 ramp and 3 tail symbols followed by 58 data symbols and 26 training symbols. Three ramp and 3 tail symbols are included at the end of the burst. In transmitter 100, burst X(t) 122 is offset in offset block 106 to generate O(t) 124. FIG. 1c illustrates a phase hopping pattern for use in transmitter 100 of FIG. 1a. An incremental phase shift is used for each burst on antenna 114b while each burst on antenna 114a is not phase shifted. In FIG. 1c, n is the number of bursts per block. The same pattern may be used on antennas 118a and 118b.

As an alternative to phase hopping, phase sweeping may be performed in phase shifter blocks 110 and 108. Phase sweeping could also be used in systems where continuous pilots are transmitted from each of the sets of antennas, as in systems operating according to the TIA/EIA/IS-2000 Standard, August 1999, published by the Telecommunications Industry Association. The phase sweeping performed by phase shifter blocks 108 and 110 may be done continuously at any desired rate.

Referring now to FIG. 2, therein is illustrated a block diagram of portions of a phased hopped delay diversity transmitter 200 according to another embodiment of the invention. Transmitter 200 includes input 202, Channel coder, Interleaver and Modulator (CIM) 204, offset block 206, phase shifter block 208, RF circuitry blocks 210, 212 and 214, and antennas 216 and 218. Transmitter 200 may be implemented into any type of transmission system that transmits coded or uncoded digital transmissions over a radio interface. In an embodiment, transmitter 200 may be implemented into a system operating according to the enhanced data for global evolution (EDGE) specification. Transmitter 200 may be implemented into an EDGE system without modifications to the EDGE receiver.

In the embodiment of FIG. 2, transmitter 200 receives input data and outputs an input symbol stream X(t) at the output of CIM 204. X(t) is split into two symbol streams with one symbol stream X(t) being input to RF circuitry block 210 and phase shifter block 208. The output of phase shifter block 208 $P_X(t)$ is then input to RF circuitry 212. The other input symbol stream X(t) is input t offset block 206. Offset block 206 causes an at least one symbol period delay in X(t) to generate an offset version of X(t) for O(t). O(t) is then input to RF circuitry block 214. X(t) is transmitted on antenna 216 and, $P_X(t)$ and O(t) are transmitted on antenna 218.

In the embodiment of FIG. 2, the second and third antennas of the embodiment of FIG. 1a are effectively mapped to a single antenna 218. The fourth antenna branch of the embodiment of FIG. 1a is effectively turned off. In the embodiment of FIG. 2a, the total transmit power may be equally split between the phase hopped and delay diversity paths. Then, effectively delay diversity gain is applied to one half the signal power and phase hopping gain is applied to one half the signal power. Using a strong channel code, for example a rate=½ convolutional code, second order diversity can be achieved. The embodiment of FIG. 2 has advantages in use in non-fading situations as compared with the embodiment of FIG. 1a, since the potential of the phase hopping channels canceling themselves out is removed. The delay diversity path of the embodiment of FIG. 2 ensures proper signal reception with some penalty, depending on how the total power is divided between the phase hopped and delay diversity paths.

Figure 4:
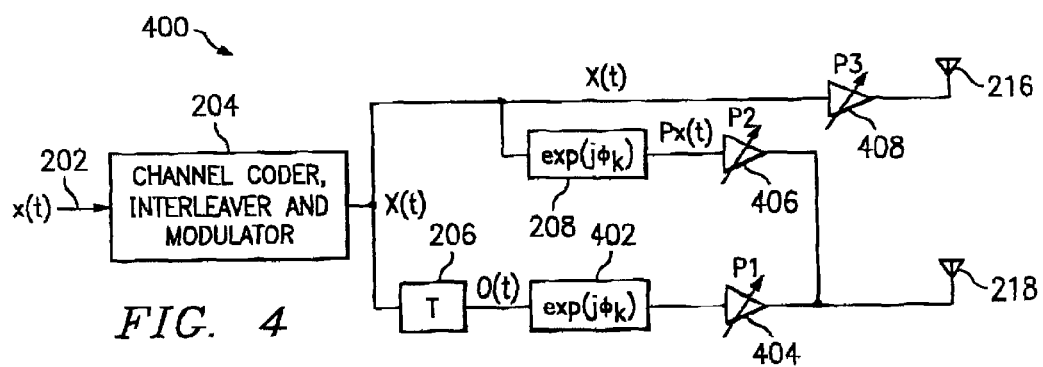
FIG. 4 is a block diagram of portions of a phase hopped delay diversity transmitter according to an alternative embodiment of FIG. 2.

FIG. 4 shows an alternative embodiment of the transmitter of FIG. 2. Transmitter 400 of FIG. 4 is identical to transmitter 200 of FIG. 2, with the exception that phase shifter 402 is added after delay block 206 and transmitters 210, 212 and 214 are replaced by variable power transmitters 408, 406 and 404, respectively. Transmitter power values for 408, 406 and 404 are indicated by P3, P2 and P1, respectively. The embodiment of FIG. 4 may be used to realise different diversity configurations by providing different branch gains.

Simple delay diversity can be realized by setting the variables in FIG. 4 to the following values: P3=1/sqrt(2), P2=0.0, and $\Phi_{k1}$=0.0. The delay can be set to 1.0T or 1.5T.

In this case half the power is sent on P3 and the remaining half on P1 with a delay.

Alternatively, the variables may be set so P3=1/sqrt(2), P2=1/sqrt(2), and P1=0.0. In this case the transmissions from two antennas may erase each other when the phase difference between the two transmissions is 180 degrees. This situation may occur in direct line of sight channels close to the base station i.e. Rician channels. To avoid this loss, the variables may be set so P3=1/sqrt(2), P1=1/sqrt(2), P2=0.0, and D=1.5T. The phase $\Phi_{k1}$ may be hopped at phase shifter 402 every burst periodically or randomly. The phase step size may be chosen to be 90 degrees in periodic hopping case and 11.25, or 90 degrees for random hopping.

In another alternative of FIG. 4, total transmitted power (P1) is transmitted on Delay Diversity (DD) branch and the remaining power (1-P1) is equally split between phase hopping PO branches. This type of transmission ensures that the antenna transmissions do not completely erase each other. The parameters of FIG. 4 are set to the following values: P3=1/sqrt(8), P1=sqrt(7/16) and $\Phi_{k1}$==0.0. In this case ⅛ of the total power is sent on DD branch and the remaining power is sent of PO branches. To further improve this method, additional phase hopping may be added on DD branch. Additionally, for this case, phase hopping $\Phi_{k1}$ at phase shifter 402 may be activated.

Referring now to FIG. 3a, therein is illustrated a block diagram of portions of an antenna hopped delay diversity transmitter 300, according to an embodiment of the invention. Transmitter 300 includes input 302, Channel coder, Interleaver and Modulator (CIM) 304, offset block 306, switch 324, RF circuitry 308, 310, 312 and 314, and antennas 316, 318, 320, and 322. Transmitter 300 may be implemented into any type of transmission system that transmits coded or uncoded digital transmissions over a radio interface. In an embodiment, transmitter 300 into a system operating according to the enhanced data for global evolution (EDGE) specification. Transmitter 300 may be implemented into an EDGE system without modification to the EDGE receiver.

In the embodiment of FIG. 3a, transmitter 300 receives input data and outputs an input symbol stream X(t) at the output of CIM 304. X(t) is split into two symbol streams with one being input to switch 324 and the other being input to offset block 306. Offset block 306 outputs a delayed version of X(t), or O(t). Phase shifter 326 outputs $P_O(t)$, which is input to switch 324. Switch 324 functions to alternate transmission bursts between antennas 316 and 318, and antennas 320 and 322, respectively. For one burst period X(t) is transmitted on antenna 316 and O(t) is transmitted on antenna 318. For the next period X(t) is transmitted on antenna 320 and O(t) is transmitted on antenna 322. The delay diversity transmission is periodically alternated between antennas 316 and 318, and antennas 320 and 322. Every other burst from a burst Y is transmitted with a second order path diversity from antennas 316 and 318 and every other burst from a burst Y+1 is transmitted with a second order path diversity from antennas 320 and 322. Extra interleaving gain may be obtained from interleaving data over several bursts. For strong channel codes, such as rate=½ convolutional codes, fourth order diversity may be realized. The embodiment of FIG. 3a may be used with phase shifter 326 activated to provide a phase shift or deactivated to provide zero phase shift in $P_O(t)$.

Figure 3B:
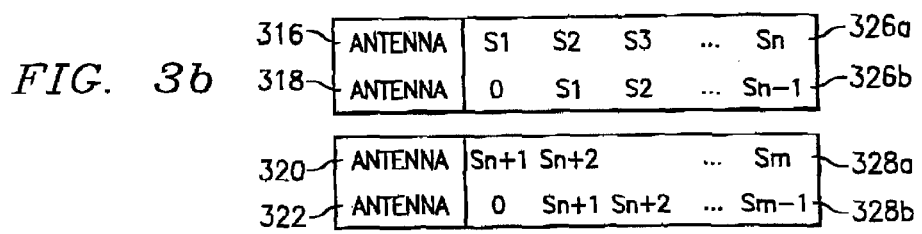

FIG. 3b illustrates transmission bursts for use in transmitter 300 of FIG. 3a. Bursts 326a and 326b are transmitted on antennas 316 and 318 respectively, and burst 328a and 328b are transmitted on antennas 320 and 322 respectively.

The described and other embodiments could be implemented in systems using any type of multiple access technique, such as time division multiple access (TDMA), code division multiple access (CDMA), frequency division multiple access (FDMA), orthogonal frequency division multiple access (OFDM), or any combination of these, or any other type of access technique. This could also include systems using any type of modulation to encode the digital data. For example, the embodiment would not require any changes to an EDGE receiver when used with these technologies. The receiver equalizer treats the delayed antenna multipath and compensates for the multipath. The receiver does not have to have phase hopping knowledge. Since both traffic and training sequences are applied with the same phase hopping, the receiver treats the signal as if it is originally without diversity. In the case of a CDMA receiver, both antennas are applied using the same Walsh Spreading Code and the same phase hopping or sweeping is performed on both traffic and pilot signals. Since both traffic and pilot channels undergo the same phase changes, this change is transparent to the receiver. In the case of a delayed antenna transmission, an equalizer would be necessary.

Thus, although the method and apparatus of the present invention has been illustrated and described with regard to presently preferred embodiments thereof, it will be understood that numerous modifications and substitutions may be made to the embodiments described, and that numerous other embodiments of the invention may be implemented without departing from the spirit and scope of the invention as defined in the following claims.

What is claimed is:

1. A method for transmitting a signal from a plurality of antennas, said method comprising the steps of:

receiving a first input symbol stream at a transmitter;

offsetting said first input symbol stream to generate a second input symbol stream, wherein said second input symbol stream is offset from said first input symbol stream by at least one symbol period;

performing a first phase shift on said first input symbol stream over a time period to generate a first phase shifted symbol stream; and transmitting, substantially simultaneously, said first input symbol stream on a first at least one antenna, said first phase shifted symbol stream on a second at least one antenna, and said second input symbol stream on said second at least one antenna.

2. The method of claim 1, wherein said first at least one antenna comprises a third and fourth at least one antenna and said second at least one antenna comprises a fifth and sixth at least one antenna and wherein said method further comprises the step of performing, before said step of transmitting, a second phase shift on said second input symbol stream, substantially simultaneously over said time period, to generate a second phase shifted signal and wherein the step of transmitting comprises transmitting, substantially simultaneously, said first input symbol stream on said third at least one antenna, said first phase shifted symbol stream on said fourth at least one antenna, said second input symbol stream on said fifth at least one antenna and said second phase shifted signal on said sixth at least one antenna.

3. The method of claim 2, wherein said step of performing a first phase shift and said step of performing a second phase shift comprise phase shifting with a continuous phase sweep.

4. The method of claim 2, wherein said step of performing a first phase shift and said step of performing a second phase shift comprise phase shifting by discrete phase hopping in different burst periods.

5. The method of claim 1, wherein said second at least one antenna comprises a single antenna, and said step of transmitting comprises transmitting said first phase shifted symbol stream and said second input symbol stream on said single antenna.

6. The method of claim 5, wherein said step of performing a first phase shift comprises phase shifting with a continuous phase sweep.

7. The method of claim 5, wherein said step of performing a first phase shift comprises phase shifting by discrete phase hopping in different burst periods.

8. The method of claim 1, wherein said step of transmitting said second input symbol stream on said second at least one antenna comprises performing a second phase shift on said second input symbol stream over a time period to generate a second phase shifted symbol stream and transmitting said second phase shifted input symbol stream on said second at least one antenna.

9. The method of claim 1, wherein said step of transmitting comprises the step of transmitting using varying gain on each of said first and second at least one antenna.

10. A method for transmitting a signal from a plurality of antennas, said method comprising the steps of:
receiving a first input symbol stream at a transmitter;
offsetting said first input symbol stream to generate a second input symbol stream, wherein said second input symbol stream is offset from said first input symbol stream by at least one symbol period;
transmitting, substantially simultaneously during a first time period, a first portion of said first input symbol stream on a first at least one antenna selected during said first time period, and a first portion of said second input symbol stream on a second at least one antenna selected during said first time period; and
transmitting, substantially simultaneously during a second period noncongruent with and subsequent to said first time period, a second portion of said first input symbol stream on a first at least one antenna selected during said second time period, and a second portion of said second input symbol stream on a second at least one antenna selected during said second time period, wherein said second portion of said first input symbol stream is subsequent in time to said first portion of said first input symbol stream, and said second portion of said second input symbol stream is subsequent in time to said first portion of said second input symbol stream.

11. The method of claim 10, wherein said steps of transmitting, substantially simultaneously during a first time period and transmitting substantially simultaneously during a second time period are performed relative to one another with a hopped diversity pattern.

12. The method of claim 11, wherein said data included in said first input symbol stream is interleaved over at least said first and second time periods.

13. The method of claim 10, wherein said step of transmitting comprises transmitting using varying gain on each of said first and second at least one antenna selected during said first time period and said first and second at least one antenna selected during said second time period.

14. An apparatus for transmitting a signal from a plurality of antennas, said apparatus comprising:
an input for receiving a first input symbol stream at a transmitter;
an offset means for offsetting said first input symbol stream to generate a second input symbol stream, wherein said second input symbol stream is offset from said first input symbol stream by at least one symbol period;
a phase shifter for performing a phase shift on said first input symbol stream over a time period to generate a first phase shifted symbol stream;
a first and second at least one antenna; and
a transmitter for transmitting, substantially simultaneously, said first input symbol stream on said first at least one antenna, said first phase shifted symbol stream on said second at least one antenna, and said second input symbol stream on said second at least one antenna.

15. The apparatus of claim 14, wherein said first at least one antenna comprises a third and fourth at least one antenna and said second at least one antenna comprises a fifth and sixth at least one antenna and wherein said phase shifter comprises a first phase shifter and apparatus further comprises a second phase shifter for performing a phase shift on said second input symbol stream, substantially simultaneously over said time period, to generate a second phase shifted signal and wherein said transmitter transmits, substantially simultaneously, said first input symbol stream on said third at least one antenna, said first phase shifted symbol stream on said fourth at least one antenna, said second input symbol stream on said fifth at least one antenna and said second phase shifted signal on said sixth at least one antenna.

16. The apparatus of claim 15, wherein said first phase shifter and said second phase shifter phase shift with a continuous phase sweep.

17. The apparatus of claim 15, wherein said first phase shifter and said step second phase shifter phase shift by discrete phase hopping in different burst periods.

18. The apparatus of claim 14, wherein said second at least one antenna comprises a single antenna, and said transmitter transmits said first phase shifted symbol stream and said second input symbol stream on said single antenna.

19. The apparatus of claim 18, wherein said phase shifter comprises phase shifting with a continuous phase sweep.

20. The apparatus of claim 18, wherein said phase shifter comprises phase shifting by discrete phase hopping in different burst periods.

21. An apparatus for transmitting a signal from a plurality of antennas, said apparatus comprising:
an input for receiving a first input symbol stream at a transmitter;
offset means for offsetting said first input symbol stream to generate a second input symbol stream, wherein said second input symbol stream is offset from said first input symbol stream by at least one symbol period;
plurality of antennas;
a transmitter for transmitting, substantially simultaneously during a first time period, a first portion of said first input symbol stream on a first at least one antenna selected during said first time period, and a first portion of said second input symbol stream on a second at least one antenna selected during said first time period and transmitting, substantially simultaneously during a second period noncongruent with and subsequent to said first time period, a second portion of said first input symbol stream on a first at least one antenna selected during said second time period, and a second portion of said second input symbol stream on a second at least one antenna selected during said second time period, wherein said second portion of said first input symbol stream is subsequent in time to said first portion of said first input symbol stream, and said second portion of said second input symbol stream is subsequent in time to said first portion of said second input symbol stream.

22. The apparatus of claim 21, wherein said transmitter transmits simultaneously during said first time period second time period, with a hopped diversity pattern.

23. The apparatus of claim 22, wherein said data included in said first input symbol stream is interleaved over at least said first and second time period.

* * * * *